US012725970B2

(12) United States Patent
Eheim et al.

(10) Patent No.: US 12,725,970 B2
(45) Date of Patent: Sep. 1, 2026

(54) TOUCH PROTECTION COVER, CONNECTION MEMBER, MODULE CONNECTOR AND BATTERY SYSTEM

(71) Applicant: TE Connectivity Solutions GmbH, Schaffhausen (CH)

(72) Inventors: Manuel Eheim, Bensheim (DE); Alexander Weber, Bensheim (DE); Patrick Distler, Bensheim (DE); Bjoern Hoffmann, Bensheim (DE); Marcus Wolf, Bensheim (DE)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 372 days.

(21) Appl. No.: 18/584,624

(22) Filed: Feb. 22, 2024

(65) Prior Publication Data

US 2024/0291197 A1 Aug. 29, 2024

(30) Foreign Application Priority Data

Feb. 23, 2023 (DE) ........................ 102023104462.1

(51) Int. Cl.
*H01R 13/627* (2006.01)
*H01R 13/621* (2006.01)
*H01R 13/64* (2006.01)

(52) U.S. Cl.
CPC ....... *H01R 13/6273* (2013.01); *H01R 13/621* (2013.01); *H01R 13/64* (2013.01); *H01R 2201/26* (2013.01)

(58) Field of Classification Search
CPC .. H01R 13/6273; H01R 13/64; H01R 13/621; H01R 2201/26

(Continued)

(56) References Cited

U.S. PATENT DOCUMENTS

| | | | | |
|---|---|---|---|---|
| 4,736,999 | A | 4/1988 | Marks et al. | |
| 5,871,371 | A * | 2/1999 | Rothenberger ........ | H01R 12/75 439/579 |
| 9,829,354 | B2 | 11/2017 | Scheibe | |
| 10,320,118 | B2 * | 6/2019 | Paul .................. | H01R 13/6276 |

(Continued)

FOREIGN PATENT DOCUMENTS

| | | | |
|---|---|---|---|
| DE | 102014116236 | A1 | 5/2016 |
| DE | 102016109882 | A1 | 11/2017 |

(Continued)

OTHER PUBLICATIONS

Search Report for corresponding DE Application No. 102023104462.1, dated Oct. 27, 2023 (8 pages).

(Continued)

*Primary Examiner* — Gary F Paumen

(74) *Attorney, Agent, or Firm* — Jay J. Hoette; Carroll, Hoette & Butscher, LLC

(57) ABSTRACT

An electrically insulating touch protection cover for an electrical module connector with two connection members connecting two current conductors in a conductive manner, wherein the touch protection cover includes two protective housings, one for each of the two connection members, that can be plugged together along a plugging direction, wherein one of the two protective housings comprises an inner collar and the other of the two protective housings comprises an outer collar that is configured to receive at least in part the inner collar, wherein the inner collar comprises at least one positive-fit element and the outer collar comprises at least one positive-fit element that is complementary thereto, wherein the positive-fit elements are configured to latch in the plugging direction, and wherein the inner collar and the outer collar are configured to be rotatable relative to each other in a latched state of the positive-fit elements.

19 Claims, 4 Drawing Sheets

(58) Field of Classification Search
USPC .......................................... 439/367, 311, 314
See application file for complete search history.

(56) References Cited

U.S. PATENT DOCUMENTS

| | | | | |
|---|---|---|---|---|
| 10,381,752 | B2 | 8/2019 | Kaehny et al. | |
| 2004/0248475 | A1* | 12/2004 | Seminara | F42B 3/26<br>439/680 |
| 2016/0131506 | A1 | 5/2016 | Scheibe | |
| 2020/0259400 | A1 | 8/2020 | Morishita | |
| 2021/0044051 | A1 | 2/2021 | Regnier et al. | |
| 2021/0143576 | A1* | 5/2021 | Lo | H01R 31/06 |
| 2021/0210904 | A1* | 7/2021 | Pacher | H01R 35/00 |
| 2022/0029340 | A1 | 1/2022 | Paintz | |
| 2022/0069520 | A1* | 3/2022 | Jaeger | H01R 13/6315 |

FOREIGN PATENT DOCUMENTS

| | | | |
|---|---|---|---|
| JP | 20199115 | A | 1/2019 |
| JP | 202222146 | A | 2/2022 |
| KR | 20180138547 | A | 12/2018 |
| KR | 20220012194 | A | 2/2022 |

OTHER PUBLICATIONS

Office Action for corresponding KR Application No. 952025095345021 dated Sep. 30, 2025 (11 pages).

Extended European Search Report for corresponding EP Application No. 24158864.9-1201 dated Jul. 3, 2024 (12 pages).

Office Action for corresponding JP Application No. 2024023318 dated Mar. 28, 2025 (9 pages).

* cited by examiner

TOUCH PROTECTION COVER, CONNECTION MEMBER, MODULE CONNECTOR AND BATTERY SYSTEM

CROSS REFERENCE TO RELATED APPLICATIONS

This application claims the benefit of DE Application No. 102023104462.1 filed 23 Feb. 2023, the subject matter of which is herein incorporated by reference in its entirety.

BACKGROUND OF THE INVENTION

The subject matter herein relates to an electrically insulating touch protection cover for an electrical module connector with two connection members connecting two current conductors to each other in a conductive manner. The subject matter herein furthermore relates to a set of two touch protection covers, a connection member, a module connector, as well as a battery system, in particular for vehicles with an electric drive.

Module connectors are used, for example, to connect, via current conductors (e.g. busbars or current strips), various electrical modules that form a battery system. High voltages and currents that are dangerous for a user, such as a mechanic in a workshop, arise in such modules. For this reason, touch protection surrounding the respective current conductors and connection members of the module connector is often provided.

The design of touch protection at the connection members is often difficult. In many cases, the touch protection obstructs the assembly of the module connector in the battery system or makes it more difficult.

There is a need for touch protection for a module connector that does not obstruct the assembly of the module connector.

BRIEF DESCRIPTION OF THE INVENTION

In one embodiment, an electrically insulating touch protection cover is provided including two protective housings, one for each of the two connection members, that can be plugged together along a plugging direction, wherein one of the two protective housings comprises an inner collar and the other of the two protective housings comprises an outer collar that is configured to receive at least in part the inner collar, wherein the inner collar comprises at least one positive-fit element and the outer collar comprises at least one positive-fit element that is complementary thereto, wherein the positive-fit elements are configured to latch in the plugging direction, and wherein the inner collar and the outer collar are configured to be rotatable relative to each other in a latched state of the positive-fit elements.

The solution may be advantageous because the two protective housings can be pre-positioned in a stationary manner due to the latching positive-fit elements before the connection members are affixed, for example, by way of screw connections. In other words, the received inner collar and the receiving outer collar establish a latching positive-fit connection acting in the plugging direction which allows for relative rotatability (at least in a predetermined angular range) between the inner collar and the outer collar. Between pre-positioning and final fixation, the two protective housings retain their relative rotatability. This allows for force-free compensation of assembly and position tolerances as needed. In addition, the touch protection cover does not necessarily have to be held by hand when the final fixation takes place.

With conventional touch protection covers, either no stationary pre-positioning can take place due to a lack of suitable positive-fit elements, or the stationary pre-positioning prevents any rotatability so that connection members, current conductors, and the touch protection cover have to be acted upon with an external force in order to be able to compensate for assembly and position tolerances. Both circumstances make the installation process more difficult as compared to the solution according to the subject matter herein.

The solution may be further improved by the following independent and individually advantageous configurations and further developments.

According to a first possible embodiment, the inner collar and the outer collar can protrude from the remainder of the respective protective housing and can be configured to be self-contained around the plugging direction. The inner collar and the outer collar then provide the connection members with continuous all-around protection. For example, the inner collar and the outer collar can be configured to be sleeve-shaped, in particular circular cylindrical. An inner diameter of the outer collar is there preferably greater than or equal to an outer diameter of the inner collar. The outer collar can accordingly receive the inner collar coaxially.

The inner collar and the outer collar preferably protrude from the remainder of the respective protective housing parallel to the plugging direction and the relative rotatability between the inner collar and the outer collar is given in a circumferential direction perpendicular to the plugging direction.

According to a further possible embodiment, the positive-fit elements can extend at different lengths around the plugging direction. The shorter positive-fit element can then move in the circumferential direction within the length of extension of the longer positive-fit element so that the relative rotatability between the inner collar and the outer collar is achieved. The length of extension can refer to a circumferential section or an angular section, respectively.

Alternatively, if both positive-fit elements extend in a self-contained manner along the entire circumference, they can also be of the same length and the relative rotatability between the inner collar and the outer collar is nevertheless given.

The latching of the positive-fit elements can be achieved in that one of the positive-fit elements has an undercut-like positive-fit surface which is arranged such that the other positive-fit element that is complementary thereto can engage there behind. This means that the at least one positive-fit element of the inner collar or the outer collar forms the positive-fit surface which points in an undercut manner towards the remainder of the corresponding protective housing and away from the other respective protective housing. The at least one positive-fit element of the other collar can also comprise, for example, a positive-fit surface or one or more knob-, nose-, wedge-, pyramid-, prism-shaped projections which in the latched state engage behind the aforementioned positive-fit surface.

The positive-fit elements in the latched state are optionally separable from one another, in particular separable in a non-destructive manner. For this purpose, the positive-fit elements can have a certain elasticity in shape and/or pulling bevels. In addition, the positive-fit elements can each be provided with insertion bevels which facilitate the plugging process in the protective housing.

According to a further possible embodiment, one of the positive-fit elements can be a latching projection and the other positive-fit element that is complementary thereto can be a latching recess. The latching projection can protrude perpendicular to the plugging direction, whereas the latching recess is recessed perpendicular to the plugging direction. For example, the inner collar can comprise at least one latching projection and the outer collar can comprise at least one latching recess configured to be complementary to the latching projection of the inner collar and/or the outer collar can comprise at least one latching projection and the inner collar can comprise at least one latching recess that is complementary to the latching projection of the outer collar.

The fact that latching projections and latching recesses can engage with one another in the latched state due to their complementarity advantageously results in saving space. Alternatively, the inner collar and outer collar can comprise only latching projections which engage behind each other when latched.

It is particularly advantageous to have the latching recess extend longer around the plugging direction than the latching projection so that the movability of the latching projection within the latching recess is ensured. This enables the relative rotatability between the inner collar and the outer collar in a way that is easy to produce.

A coding slot running in the plugging direction can optionally lead into the latching recess. The coding slot can extend from an outer edge of the inner collar or the outer collar into the latching recess. The coding slot and the latching recess together optionally create an L-shaped profile. An inner contour of the coding slot preferably corresponds at least in sections to an outer contour of the latching projection. Alternatively, the coding slot can be configured to be slightly flatter than the latching projection so that a snap mechanism is created.

The shape of the coding slot allows for a key-and-lock principle to be implemented which ensures that only matching inner collars and outer collars can be plugged together (i.e. if the inner contour of the coding slot and the outer contour of the latching projection match). In addition, the position of the coding slot can specify an angular range in which the inner collar and the outer collar must be located relative to each other in order to be able to be plugged together. If there are several latching projections present, a separate coding slot can be provided for each latching projection.

As already indicated, the inner collar and the outer collar can each comprise at least two positive-fit elements. In other words, at least two positive-fit elements can be present on the inner collar and at least two further positive-fit elements on the outer collar. The positive-fit elements of different collars are there preferably configured to be complementary to each other in pairs. The advantage of this embodiment are the comparatively large positive latching forces. In order to achieve improved stability, the at least two positive-fit elements of the same collar can be disposed diametrically opposite one another. If there are more than two positive-fit elements present, they can be distributed evenly or unevenly in the circumferential direction.

According to a further possible embodiment, the at least two positive-fit elements of the same collar can be arranged at different heights with respect to the plugging direction. In particular, the at least two positive-fit elements of the same collar can be spaced from one another in the plugging direction. The two positive-fit elements of the same collar are optionally offset from one another in the circumferential direction. The height position of the positive-fit elements also leads to the key-and-lock principle already mentioned. Differences in the length, width, depth and contour of the at least two positive-fit elements of the same collar can also be provided for implementing the key-and-lock principle.

To simplify the geometry, the at least two positive-fit elements of the same collar can alternatively be arranged at the same height with respect to the plugging direction and/or can be configured analogously with regard to their geometric shape.

By using a set comprising two touch protection covers, each according to one of the preceding embodiments, wherein the protective housings of the two touch protection covers have the same dimensions in pairs except for the position and/or size of the positive-fit elements, two different module connectors can be equipped with a mutual incorrect-plugging-protection. In other words, in the set according to the subject matter herein, the protective housings of one touch protection cover cannot be plugged together with the protective housings of the other touch protection cover in the plugging direction. This facilitates the installation of the respective module connectors because incorrect plugging is prevented. That means the set according to the subject matter herein satisfies the object set out at the outset.

The position of the positive-fit elements can be given, for example, by an angular position or height position. The angular position or height position there pertains to the uppermost edge, the lowermost edge, or the center of the respective positive-fit element relative to the respective collar. The size of the positive-fit elements can be given, for example, by their volume, their surface, or their cross-sectional circumferential length.

The object posed at the outset is further satisfied by a connection member for an electrical module connector, wherein the connection member is equipped with a protective housing, a current conductor leading into the protective housing, and a contact element arranged at one end of the current conductor. The contact element can be, for example, a current bridge through which an electrical current flows to and/or from the current conductor during operation of the module connector. A collar (i.e. inner collar or outer collar) of the protective housing projects over the contact element, wherein the protective housing is configured as a protective housing of a touch protection cover according to one of the preceding embodiments.

The connection member according to the subject matter herein therefore benefits from the advantages of the touch protection cover. In particular, when plugged together with a complementary mating connection member, which comprises the respective other protective housing of the touch protection cover, the connection member can be pre-positioned in a manner rotatable until final fixation. This facilitates the installation of the connection member, in particular with regard to the compensation of assembly and position tolerances, which is possible without force due to the rotatability.

For the same reason, an electrical module connector comprising two connection members and a touch protection cover also satisfies the object posed at the outset, wherein the two connection members are arranged at least in sections in the touch protection cover and are rotatable relative to each other. In order to make use of the advantages and functions of the touch protection cover according to the subject matter herein already explained, the touch protection cover in the module connector can be configured according to one of the embodiments above.

In particular, the touch protection cover for the respective contact element of the two connection members can form a finger protection in that the inner collar or the outer collar projects in the plugging direction over the corresponding contact element. Contact of a user's finger with the live components (e.g. contact element and current conductor) can thus be prevent, which is simulated, for example, by a test finger according to the typical standards, for example according to DIN EN 60529:2000, which defines a length of 80 mm and a diameter of 12 mm for the test finger. Other relevant standards can be: VDE 0470 part 2, IEC/EN 61032, VDE 0470 part 1 as well as IEC/EN 60529, IEC/EN 60950, IEC 61010, IEC/EN 60335, IEC/EN 60745-1, IEC/EN 60034-5 and IEC/EN 60065.

The two connection members of the module connector can optionally each comprise a fastening element. This can be, for example, a fastening element for a screw connection. For example, one connection member comprises a screw with an external thread and the other connection member comprises a matching threaded sleeve or nut with an internal thread. Alternatively, a rivet connection can also be used. Each fastening element runs preferably coaxially to the inner collar and/or the outer collar of the protective housing.

In this embodiment, the latching positive-fit connection between the inner collar and the outer collar serves to pre-position the connection members, and the fastening elements are used for the actual final fixation of the connection members. Advantageously, the connection members in the state of pre-positioning can be rotated relative to each other, which can, among other things, facilitate the final fixation step. In addition, any unnecessary application of force, which would subject the module connector to permanent stress after the final fixation, can be avoided in this way before the final fixation.

A battery system, in particular of vehicles with an electric drive, can be installed more easily if it utilizes the functions and advantages of the touch protection cover according to the subject matter herein. For this reason, a battery system having a module connector according to one of the preceding embodiments and at least two electrical modules satisfies the object posed at the outset. The two electrical modules are connected to each other by way of the two connection members of the module connector. Since a force-free compensation of assembly and position tolerances was possible at the time of their installation, the two electrical modules as well as the two connection members are subjected to less stress than with conventional battery systems which allow for tolerance compensation only through the introduction of external forces.

The two electrical modules can be battery modules, control units, power converters, etc. Of course, the battery system can also comprise more than two electrical modules.

Any reference to norms and standards (e.g. DIN/IEC/EN standards) in the present application refers to the version of the respective norm or standard in force at the time of filing.

The subject matter herein shall be explained hereafter in more detail with reference to the drawings on the basis of several exemplary embodiments, the different features of which may be combined with one another as required in accordance with the above observations. In particular, individual features can be added to the described embodiments in accordance with the above explanations if the effect of these features is necessary for a specific application. Conversely, individual features can be omitted from the existing embodiments if the technical effect of these features is not important in a specific application. Similar, identical, and functionally identical elements in the drawings are provided with the same reference numerals to the extent as appropriate.

DETAILED DESCRIPTION OF THE INVENTION

Figure 2:
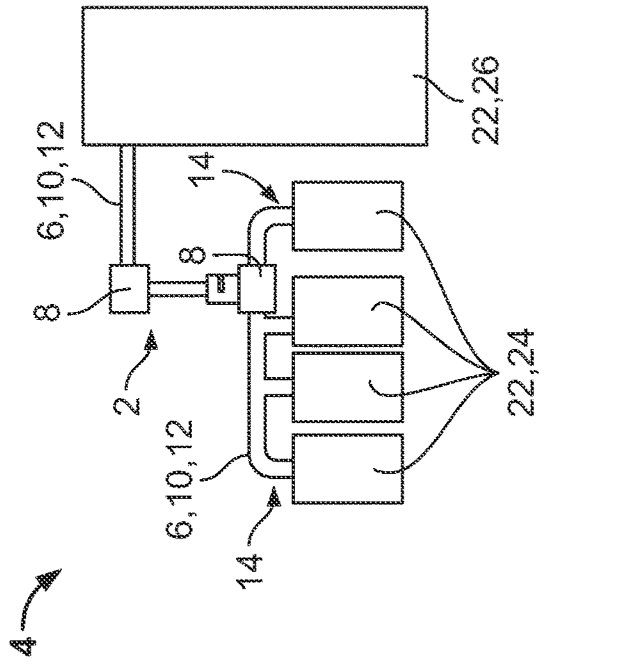
FIG. 2 shows a schematic side view of an exemplary embodiment of a battery system.
Figure 1:
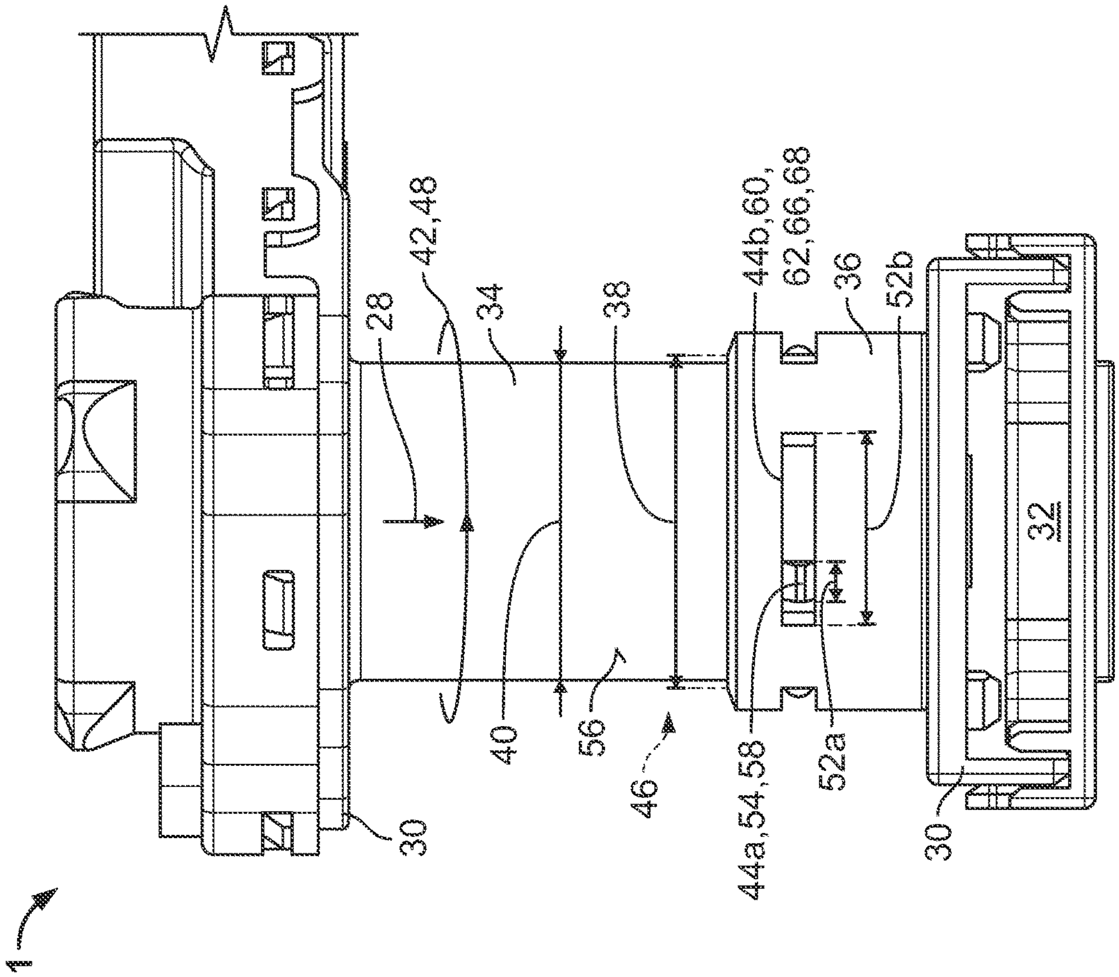
FIG. 1 shows a schematic side view of an exemplary embodiment of a touch protection cover.
Figure 3:
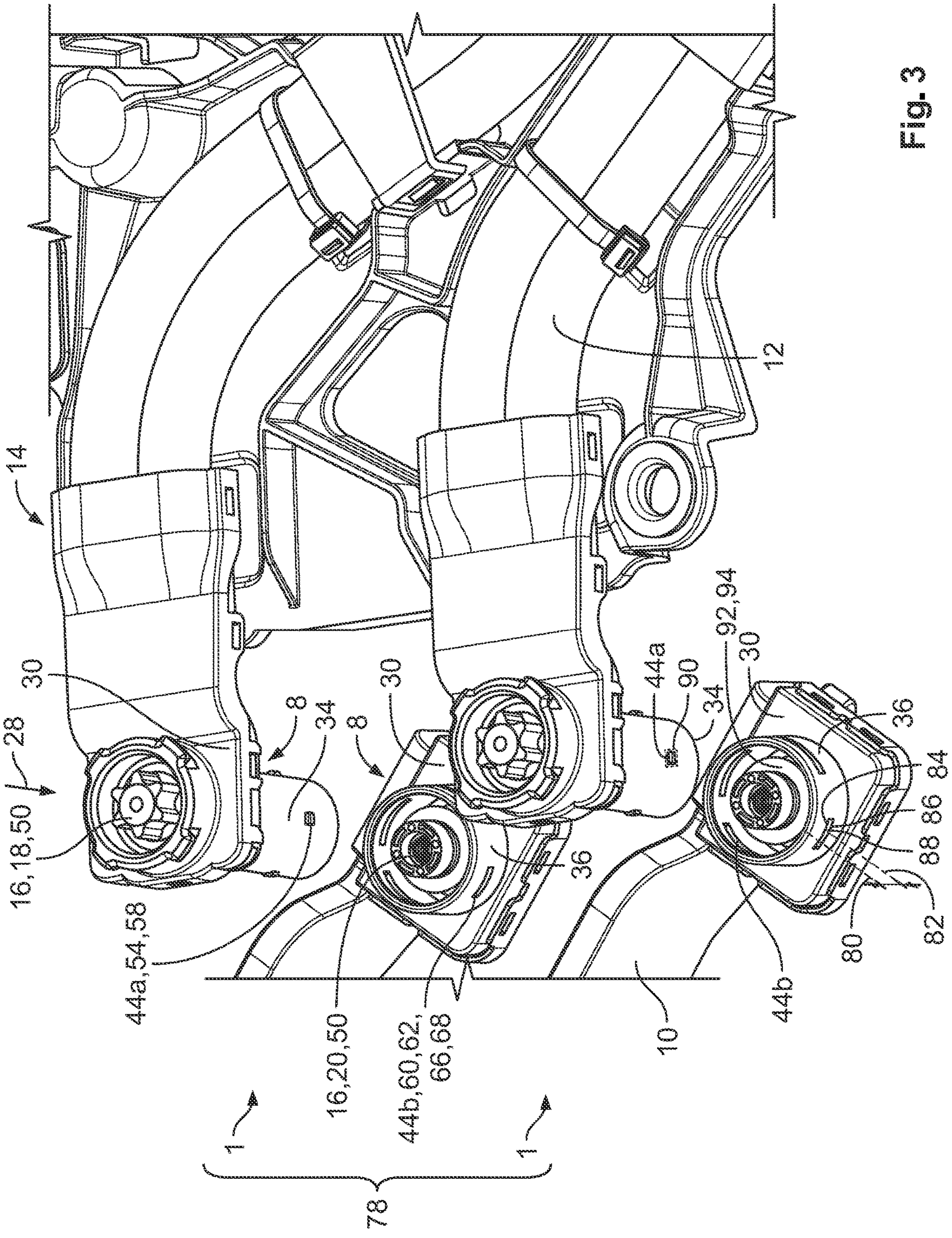
FIG. 3 shows a schematic perspective view of an exemplary embodiment of two module connectors in an exploded view.

FIG. 1 shows an exemplary embodiment of an electrically insulating touch protection cover 1 for an electrical module connector 2. FIG. 2 shows a simplified illustration of a battery system 4 with module connector 2, whereas FIG. 3 shows several module connectors 2. As can be seen, each module connector 2 comprises at least two current conductors 6 which can be connected to each other in a conductive manner via two connection members 8. Current conductors 6 are, for example, busbars 10, current strips 12, or cables that are installed individually or in pairs.

Each connection member 8 is arranged at one end 14 or between two ends 14 of respective current conductor 6. Furthermore, each connection member 8 comprises a fastening element 16, for example, a fastening element for a screw connection 50. For example, one connection member 8 comprises a screw 18 with an external thread and other connection member 8 comprises a matching threaded sleeve 20 with an internal thread.

Two or more electrical modules 22 of battery system 4 are connected to each other by way of current conductors 6 and connection members 8. Electrical modules 22 can be battery modules 24, control units 26, or current converters of battery system 4, respectively.

As can be seen in FIG. 1, touch protection cover 1 comprises two protective housings 30, one for each of the two connection members 8, that can be plugged together along a plugging direction 28. In other words, two connection members 8 can each be arranged at least in sections in one of the protective housings 30 of touch protection cover 1. For this purpose, each protective housing 30 can comprise an inner cavity 32 in which one of the two connection members 8 can be received at least in sections. Furthermore, each protective housing 30 can be structured as two parts in order to facilitate the reception of connection member 8. However, protective housings 30 being configured integrally are also possible.

One of the two protective housings 30 comprises an inner collar 34 and the other of the two protective housings 30 comprises an outer collar 36 which is configured to receive inner collar 34 at least in sections.

Inner collar 34 and outer collar 36 can protrude from the remainder of respective protective housing 30 and can be configured to be self-contained around the plugging direction. In the example shown, inner collar 34 and outer collar 36 are configured to be sleeve-shaped, in particular circular cylindrical. An inner diameter 38 of outer collar 36 there is preferably greater than or equal to an outer diameter 40 of inner collar 34. Outer collar 36 can accordingly receive inner collar 34 coaxially.

Inner collar 34 comprises at least one positive-fit element 44*a* and outer collar 36 comprises at least one positive-fit element 44*b* complementary thereto. Positive-fit elements 44*a*, 44*b* are configured to latch in plugging direction 28. Furthermore, inner collar 34 and outer collar 36 are configured to be rotatable relative to each other in a latched state 46 of positive-fit elements 44*a*, 44*b*. This is indicated in FIG. 1 by arrows 48.

The two protective housings 30 can therefore be prepositioned in a stationary manner due to latching positive-fit elements 44*a*, 44*b* before connection members 8 are affixed by way of screw connection 50, without having to be held thereafter. Meanwhile, the two protective housings 30 and also connection members 8 therein retain their relative rotatability. This consequently enables a compensation of assembly and position tolerances, which is often necessary to be carried out without force when current conductors 6 are routed in an anfractuous manner.

In particular, inner collar 34 and outer collar 36 can protrude from the remainder of the respective protective housing 30 parallel to plugging direction 28 so that the relative rotatability between inner collar 34 and outer collar 36 is given in a circumferential direction 42 perpendicular to plugging direction 28 (see FIG. 1).

As can be seen in FIG. 1, positive-fit elements 44*a*, 44*b* on respective collar 34, 36 can extend at different lengths around plugging direction 28 (i.e. in circumferential direction 42). Shorter positive-fit element 44*a* can then move in the circumferential direction within a length of extension 52*b* of longer positive-fit element 44*b* so that the relative rotatability between inner collar 34 and outer collar 36 is achieved. Length of extension 52*b* can there refer to a circumferential section or an angular section, respectively.

In the embodiment shown in FIGS. 1, positive-fit element 44*a* is a latching projection 54, in particular a bead-like projection, which projects radially perpendicular to plugging direction 28 from an outer surface 56 of inner collar 34 (collar lateral surface). The bead-like projection can be formed by a circumferential annular bead (not shown) or an annular bead segment 58.

The complementary other positive-fit element 44*b* can be a latching recess 60 which is recessed as a groove-like recess perpendicular to plugging direction 28. In particular, the groove-like recess can be formed by a circumferential annular groove (not shown) or an annular groove segment 62 in inner surface 64 of outer collar 36 (collar lateral surface). As shown in FIG. 1, latching recess 60 can penetrate the corresponding collar 34, 36 as a window-like opening 66 or through hole 68, respectively.

According to the embodiment shown in FIG. 1, inner collar 34 can comprise the at least one latching projection 54 and outer collar 36 can comprise the at least one latching recess 60 configured to complement latching projection 54 of inner collar 34. Alternatively, outer collar 36 can comprise the at least one latching projection and inner collar 34 the at least one latching recess that is complementary to the latching projection of outer collar 36.

The relative rotatability between inner collar 34 and outer collar 36 in latched state 46 in the embodiment shown in FIG. 1 is based on latching recess 60 extending longer around plugging direction 29 than latching projection 54. In other words, groove-like recess has a greater length of extension 52*b* in circumferential direction 42 than length of extension 52*a* of the bead-like projection.

As can be seen in FIG. 1, inner collar 34 and outer collar 36 can each comprise several positive-fit elements 44*a*, 44*b*. In other words, at least two positive-fit elements 44*a* can be present at inner collar 34 and at least two further positive-fit elements 44*b* at outer collar 36. Positive-fit elements 44*a*, 44*b* of different collars are there preferably configured to be complementary to each other in pairs.

Figure 7:
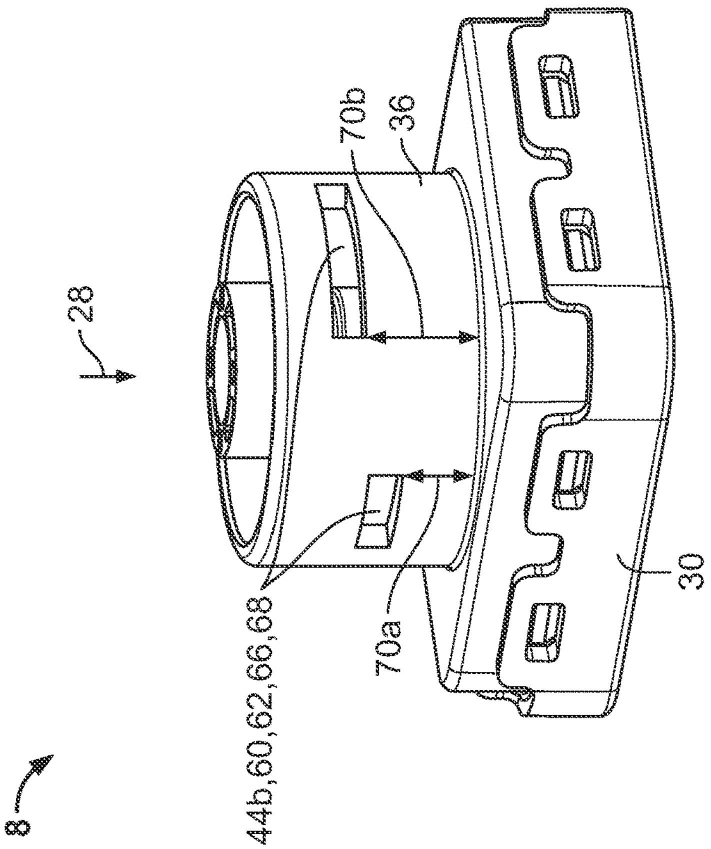
FIG. 7 shows a schematic perspective view of a third exemplary embodiment of a connection member.
Figure 6:
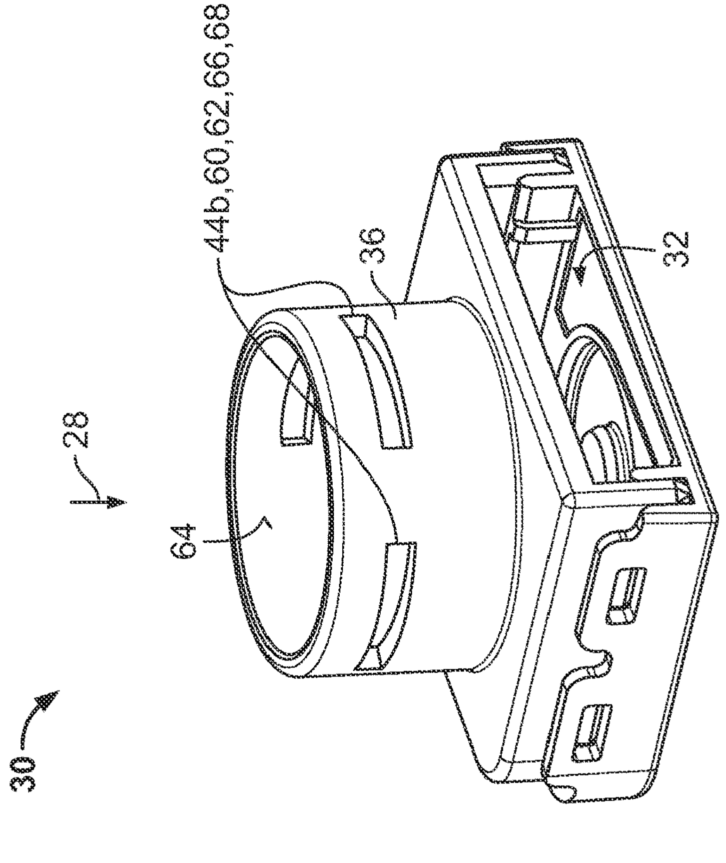
FIG. 6 shows a schematic perspective view of a second exemplary embodiment of a connection member.

According to the embodiment shown in FIG. 7, the at least two positive-fit elements 44*b* of the same collar can be arranged at different heights 70*a*, 70*b* with respect to plugging direction 28. In particular, the at least two positive-fit elements 44*a*, 44*b* of the same collar 34, 36 can be spaced from one another in plugging direction 28. The two positive-fit elements 44*a*, 44*b* of the same collar 34, 36 are optionally also offset from one another in circumferential direction 42. Alternatively, the at least two positive-fit elements 44*b* of the same collar 36 can be arranged at the same height with respect to plugging direction 28 (see FIG. 6).

Figure 5:
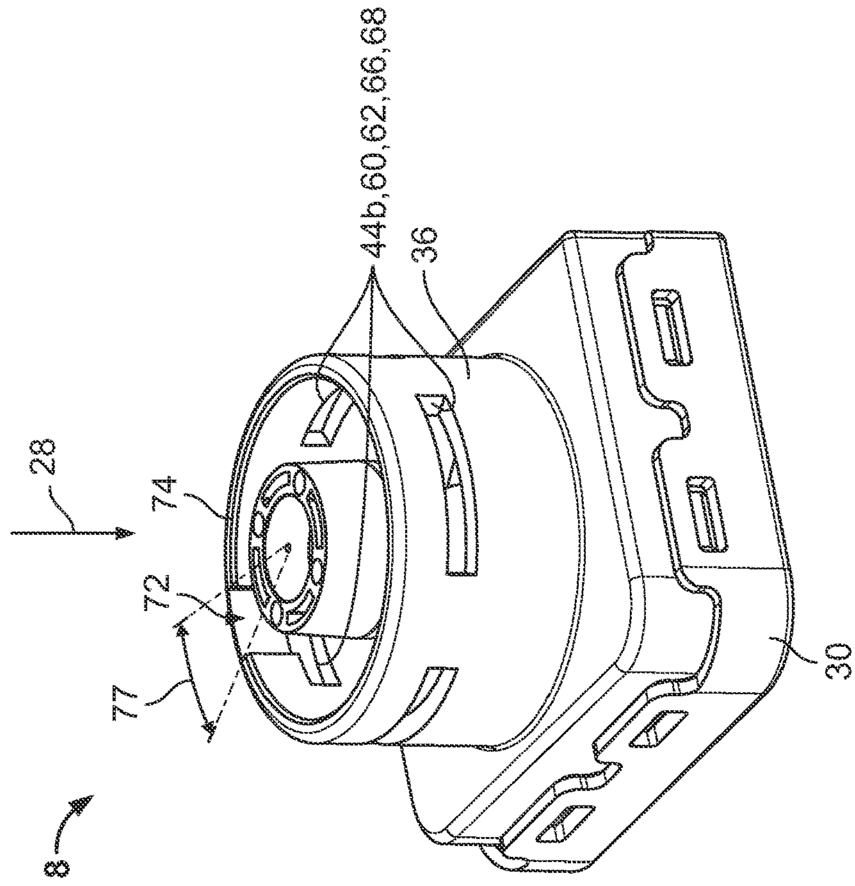
FIG. 5 shows a further schematic perspective view of the connection member of FIG. 4.
Figure 4:
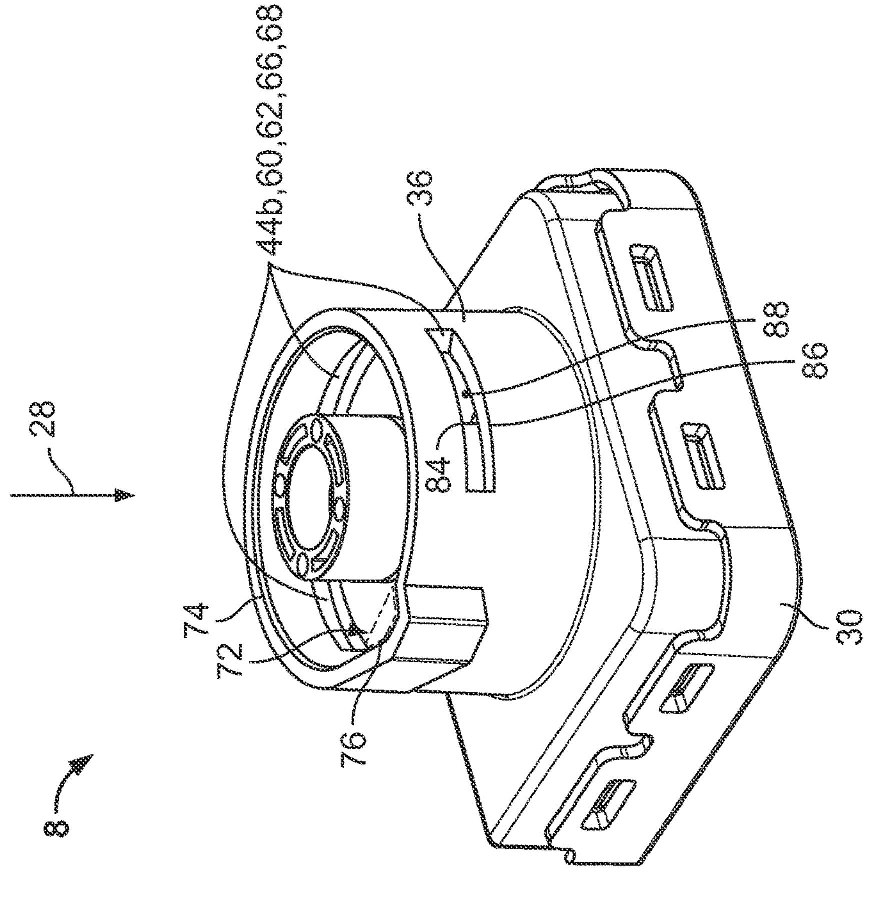
FIG. 4 shows a schematic perspective view of a first exemplary embodiment of a connection member.

FIGS. 4 and 5 show an embodiment in which a coding slot 72 running in plugging direction 28 leads into latching recess 60 on outer collar 36. Coding slot 72 can extend from an outer edge 74 of outer collar 36 into latching recess 60. Coding slot 72 and latching recess 60 together there create an L-shaped profile (see FIG. 5).

An inner contour 76 of coding slot 72 corresponds at least in sections to an outer contour (not shown) of latching projection 54. The shape of coding slot 72 allows for a key-and-lock principle to be implemented which ensures that only matching inner collars 34 and outer collars 36 can be plugged together (i.e. when inner contour 76 of coding slot 72 and the outer contour of latching projection 54 match). In addition, the position of coding slot 72 can specify an angular range 77 in which inner collar 34 and outer collar 36 must be located relative to each other in order to be able to be plugged together. If there are several latching projections present, a separate coding slot can optionally be provided for each latching projection.

A set 78 with two touch protection covers 1 is installed in two module connectors 2 of FIG. 3. Two touch protection covers 1 are each configured according to the embodiment from FIG. 1, wherein the protective housings 30 of the two touch protection covers 1 have the same dimensions in pairs except for the position and/or size of positive-fit elements 44*a*, 44*b*. In other words, a protective housing 30 of one of the two touch protection covers 1 comprises an inner collar 34 which has the same dimensions as an inner collar 34 of a protective housing 30 of the other touch protection cover 1. Only the positive-fit elements 44*a* at the respective inner collars 34 differ in position and/or size. Both touch protection covers 1 each have a protective housing 30 with an outer collar 36, wherein outer collars 36 comprise positive-fit elements 44*b* with different positions and/or sizes among each other, but otherwise have the same dimensions.

In set 78, protective housings 30 of one touch protection cover 1 can therefore not be plugged together in plugging direction 28 with protective housings 30 of the other touch protection cover 1. Consequently, there is a mutual incorrect plugging protection between two module connectors 2.

The position of positive-fit elements 44*a*, 44*b* can be given, for example, by an angular position 80 and/or height position 82. Angular position 80 or height position 82 there applies to an uppermost edge 84, a lowermost edge 86 or a center 88 of the respective positive-fit element 44*b* with respect to a reference point at the corresponding collar 36. The size of positive-fit elements 44*a*, 44*b* can be given, for example, by their volume 90, their surface, or their cross-sectional circumferential length.

FIGS. 4 and 5 show connection member 8 for electrical module connector 2 in an exemplary embodiment. Connection member 8 comprises protective housing 30 which is configured as a protective housing 30 of touch protection cover 1.

Leading into protective housing 30 is current conductor 6, at the end 14 of which a contact element 92 (see FIG. 3) is arranged. Contact element 92 can be, for example, a current bridge 94 through which an electrical current flows to and/or from current conductor 6 during operation of module connector 2. A collar (i.e. inner collar 34 or outer collar 36) of protective housing 30 projects over contact element 92.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. Electrically insulating touch protection cover for an electrical module connector with two connection members connecting two current conductors in a conductive manner, wherein said touch protection cover comprises:

two protective housings, one for each of said two connection members, that can be plugged together along a plugging direction;

wherein one of said two protective housings comprises an inner collar and the other of said two protective housings comprises an outer collar that is configured to receive at least in part said inner collar;

wherein said inner collar comprises at least one positive-fit element and said outer collar comprises at least one positive-fit element that is complementary thereto;

wherein said positive-fit elements are configured to latch in said plugging direction; and wherein said inner collar and said outer collar are configured to be rotatable relative to each other in a latched state of said positive-fit elements.

2. Touch protection cover according to claim 1, wherein said inner collar and said outer collar protrude from the remainder of said respective protective housing and are configured to be self-contained around said plugging direction.

3. Touch protection cover according to claim 1, wherein said positive-fit elements extend at different lengths around said plugging direction and wherein one of said positive-fit elements has an undercut-like positive-fit surface which is arranged such that said other positive-fit element that is complementary thereto can engage therebehind.

4. Touch protection cover according to claim 1, wherein one of said positive-fit elements is a latching projection and said other positive-fit element that is complementary thereto is a latching recess.

5. Touch protection cover according to claim 4, wherein said latching recess extends longer around said plugging direction than said latching projection.

6. Touch protection cover according to claim 5, wherein a coding slot running in said plugging direction leads into said latching recess and an inner contour of said coding slot corresponds at least section-wise to an outer contour of said latching projection.

7. Touch protection cover according to claim 1, wherein said inner collar and said outer collar each comprise at least two positive-fit elements which are configured to be complementary to each other in pairs.

8. Touch protection cover according to claim 7, wherein said at least two positive-fit elements of said same collar are arranged at different or equal heights with respect to said plugging direction.

9. Touch protection cover according to claim 7, wherein said at least two positive-fit elements of said same collar are spaced from one another in said plugging direction and offset from one another in a circumferential direction.

10. Connection member for an electrical module connector comprising:

a protective housing of a touch protection cover, said protective housing including a collar that is configured to interface with a complementary collar of another protective housing of another connection member forming the touch protection cover, said collar comprises at least one positive-fit element complementary to at least one positive-fit element of the other protective housing and configured to latch in a plugging direction, wherein said collar is configured to be rotatable relative to the complementary collar of the other protective housing in a latched state of said positive-fit element;

a current conductor leading into said protective housing; and a contact element arranged at said current conductor, wherein said collar of said protective housing projects over said contact element.

11. Module connector according to claim 10, wherein said inner collar and said outer collar protrude from the remainder of said respective protective housing and are configured to be self-contained around said plugging direction.

12. Module connector according to claim 10, wherein said positive-fit elements extend at different lengths around said plugging direction and wherein one of said positive-fit elements has an undercut-like positive-fit surface which is arranged such that said other positive-fit element that is complementary thereto can engage therebehind.

13. Module connector according to claim 10, wherein one of said positive-fit elements is a latching projection and said other positive-fit element that is complementary thereto is a latching recess.

14. Electrical module connector comprising:

two connection members; and a touch protection cover including two protective housings, one for each of said two connection members, that can be plugged together along a plugging direction, wherein one of said two protective housings comprises an inner collar and the other of said two protective housings comprises an outer collar that is configured to receive at least in part said inner collar, said inner collar comprises at least one positive-fit element and said outer collar comprises at least one positive-fit element that is complementary thereto, said positive-fit elements are configured to latch in said plugging direction, wherein said inner collar and said outer collar are configured to be rotatable relative to each other in a latched state of said positive-fit elements;

wherein said two connection members are arranged in said touch protection cover and are rotatable relative to each other.

15. Module connector according to claim 10, wherein said positive-fit elements extend at different lengths around said plugging direction and wherein one of said positive-fit elements has an undercut-like positive-fit surface which is arranged such that said other positive-fit element that is complementary thereto can engage therebehind.

16. Module connector according to claim 10, wherein said two connection members each comprise a fastening element, wherein each fastening element runs coaxially to said inner collar and/or said outer collar of said protective housing.

17. Battery system for an electric drive of an electric vehicle comprising:

a module connector including two connection members and a touch protection cover including two protective housings, one for each of said two connection members, that can be plugged together along a plugging direction, wherein one of said two protective housings comprises an inner collar and the other of said two protective housings comprises an outer collar that is configured to receive at least in part said inner collar, said inner collar comprises at least one positive-fit element and said outer collar comprises at least one positive-fit element that is complementary thereto, said positive-fit elements are configured to latch in said plugging direction, wherein said inner collar and said outer collar are configured to be rotatable relative to each other in a latched state of said positive-fit elements, wherein said two connection members are arranged in said touch protection cover and are rotatable relative to each other; and at least two electrical modules, wherein said two electrical modules are connected by way of said two connection members of said module connector.

18. Battery system according to claim 17, wherein said positive-fit elements extend at different lengths around said plugging direction and wherein one of said positive-fit elements has an undercut-like positive-fit surface which is arranged such that said other positive-fit element that is complementary thereto can engage therebehind.

19. A touch protection system comprising:

two touch protection covers for an electrical module connector with two connection members connecting two current conductors in a conductive manner, wherein each said touch protection cover includes two protective housings, one for each of said two connection members, that can be plugged together along a plugging direction, wherein one of said two protective housings comprises an inner collar and the other of said two protective housings comprises an outer collar that is configured to receive at least in part said inner collar, wherein said inner collar comprises at least one positive-fit element and said outer collar comprises at least one positive-fit element that is complementary thereto, wherein said positive-fit elements are configured to latch in said plugging direction, and wherein said inner collar and said outer collar are configured to be rotatable relative to each other in a latched state of said positive-fit elements;

wherein said protective housings of said two touch protection covers have the same dimensions in pairs except for the position and/or size of said positive-fit elements.

* * * * *